Patented Aug. 22, 1950

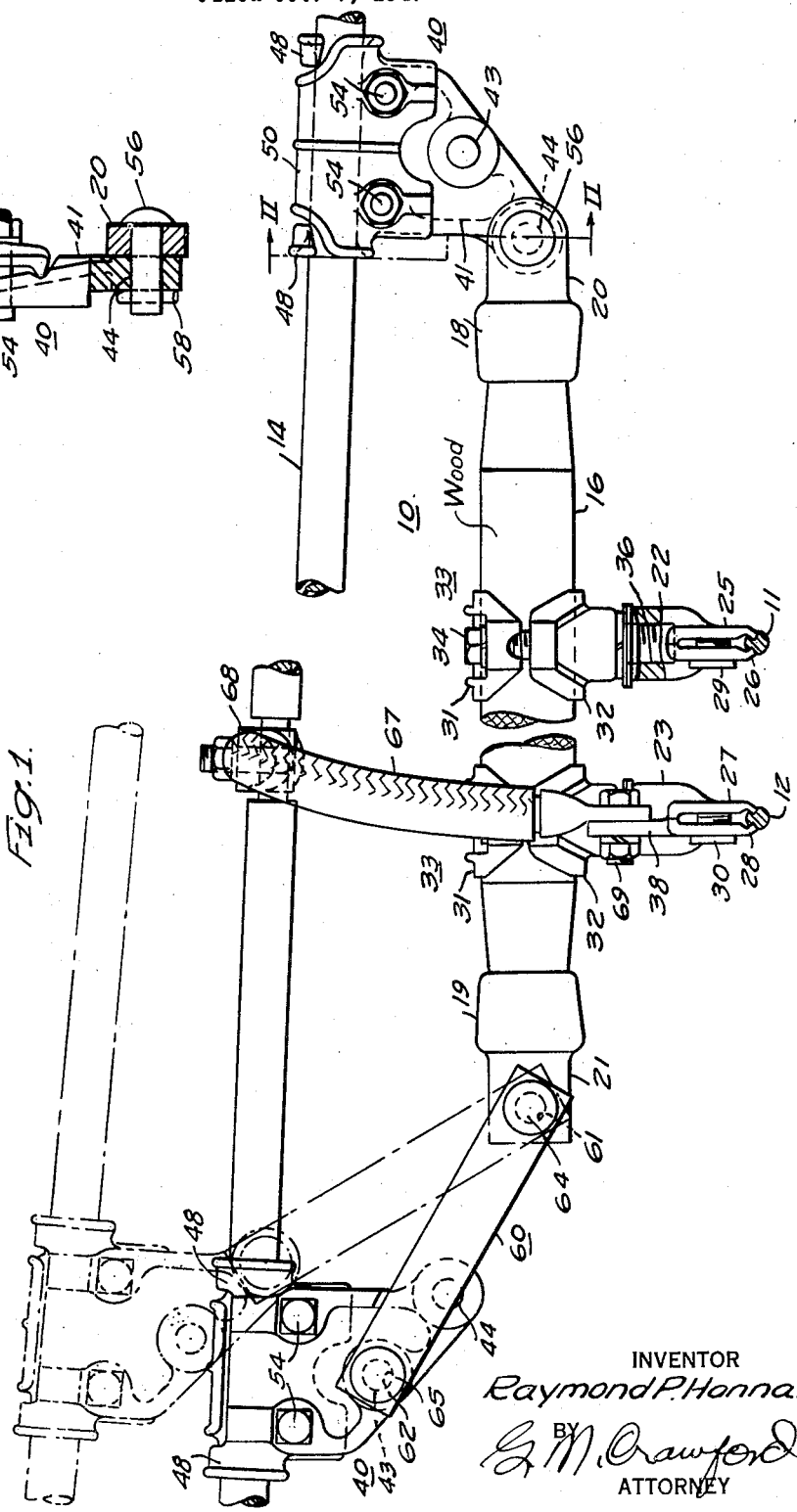

2,519,962

UNITED STATES PATENT OFFICE 2,519,962

TROLLEY CONDUCTOR SUPPORT

Raymond P. Hanna, Pittsburgh, Pa., assignor to Westinghouse Electric Corporation, East Pittsburgh, Pa., a corporation of Pennsylvania Application October 7, 1947, Serial No. 778,506

2 Claims. (Cl. 191—40)

1

My invention relates, generally, to trolley conductor devices, and it has reference, in particular, to a double trolley conductor feeder span hanger.

Generally stated, it is an object of my invention to provide an improved double trolley conductor feeder span hanger that is simple and inexpensive to manufacture, and is reliable and effective in operation.

More specifically, it is an object of my invention to provide an adjustable feeder span hanger for flexibly supporting a pair of trolley conductors.

Another object of my invention is to provide for connecting a substantially rigid trolley conductor hanger member in hinged relation to support clamp members on a feeder cable.

Yet another object of my invention is to provide for using a link member for adjustably connecting one end of a trolley hanger to a support clamp member which is adjustably positionable on an inclined feeder span wire.

It is also an object of my invention to provide, in a double trolley conductor hanger, for supporting a wood stick from an insulated feeder cable with both ends insulated therefrom, and to provide a flexible feeder connection to whichever of the conductor supports on the wood stick is to be energized from the feeder.

An important object of my invention is to provide a "soft" or flexible mounting for a pair of trolley conductors by using a double trolley conductor hanger wherein one end of a substantially rigid support member is hinged to a clamp on an inclined feeder cable, and the other end is connected by means of a link member to an additional clamp which is adjustably positionable along the feeder cable so as to support the insulating member in a substantially horizontal position.

Other objects will in part be obvious, and will in part be explained hereinafter.

In practicing my invention in one of its forms, a pair of ears for supporting trolley conductors are positioned in spaced relation by means of clamps on a wood stick having end fittings. The wood stick is supported from an inclined feeder cable by means of a clamp gripping the feeder cable and having a hinged connection with the end fitting adjacent the lower portion of the feeder cable. The other end fitting is supported in adjustable relation to the feeder cable by means of a link which is hinged to the end fitting and to a clamp which is adjustably positionable on the feeder cable to raise or lower the end fitting in order to support the wood stick in a horizontal position. A flexible feeder connects one of the trolley ears electrically to the feeder cable.

For a more complete understanding of the nature and scope of my invention, reference may be made to the following detailed description, which may be studied in connection with the accompanying drawing, in which:

Figure 1 is a front elevational view, broken out in part, of a double trolley conductor feeder span hanger embodying the invention in one of its forms; and Fig. 2 is a sectional view taken along the line II—II of Fig. 1, without the cable.

Referring to Fig. 1, the reference numeral 10 may denote, generally, a double trolley conductor feeder span hanger for supporting a pair of trolley conductors 11 and 12 in predetermined spaced relation from an inclined feeder span wire or cable 14.

The feeder span hanger 10 may comprise an elongated insulating member 16 such as, for example, a wood stick having end fittings 18 and 19 thereon provided with lugs 20 and 21, respectively. The trolley conductors 11 and 12 may be supported from the wood stick 16 by means of trolley ears 22 and 23, which are provided with relatively adjustable clamping portions 25, 26 and 27, 28, respectively, having means such as the bolts 29 and 30 for drawing the clamping members together to grip the upper portions of the trolley conductors therebetween.

The ears 22 and 23 may be mounted on the wood stick 16 by means of support means 33 comprising, for example, complementary clamp members 31 and 32 which may be secured about the wood stick by means of bolts 34. The lower clamp members 32 may be provided with threaded studs 36 for attachment of the trolley ears. The trolley ear 23 may be provided with a lug 38 for attaching a feeder therethrough for supplying electrical energy to the trolley conductor 12.

In order to provide a relatively "soft" or flexible mounting for the trolley conductors 11 and 12, the end fitting 18 adjacent the lower portion of the inclined feeder cable 14 may be supported from the cable by means of a clamp support 40. As shown in Figs. 1 and 2, the clamp support may comprise a relatively flat body portion 41 having openings 43 and 44 therein. The body portion may be provided with a longitudinal groove 46 adjacent the upper edge having arcuate horns 48 adjacent the ends for receiving the cable 14. The groove may be enlarged towards its ends and inner surfaces of the horns may be curved to provide a bell-mouth entrance. A rib 49 may be provided intermediate the ends of the groove to grip the insulation of the cable 14. A separate clamp member 50 may be provided having a groove or channel 52 cooperative with the groove 46 of the body member to grip the cable 14. The groove 52 may also be enlarged adjacent the ends to provide a uniform bell-mouth entrance, and a rib 53 may be provided intermediate the ends for gripping the cable 14. Means, such as the bolts 54, may be utilized to effect clamping engagement of the body member and clamp member 50 with the cable.

The end fitting 18 may be connected to the clamp support 40 in hinged relation, being, for example, connected thereto by means of a pin 56 passing through an opening in the ear 20 and the opening 44 of the body member 41 wherein it may be secured in any suitable manner such as by means of a cotter pin 58. This provides a relatively loose hinged connection which permits angular movement of the wood stick relative to the cable 14 in a substantially vertical plane through the cable.

The other end fitting 19 adjacent the higher portion of the cable 14 may be supported from the cable by means of a similar clamp support 40 and a connector 60. The connector 60 may comprise a substantially rigid link having openings 61 and 62 adjacent the ends for receiving pins 64 and 65 which effect relatively loose hinged connections with the ear 21 of the end fitting and the body portion of the clamp support. This also provides a hinged connection permitting angular movement of the wood stick and cable in a substantially vertical plane.

Electrical energy may be supplied to the trolley conductor 12 by means of a flexible feeder 67 which may be electrically connected to the cable 14 by means of a suitable clamp 68, and connected to the lug 38 on the trolley ear 23 by means of a bolt 69.

When the hanger is used with span wires or cables having slopes of from about 2 to 4 degrees, the upper hole 43 may be used to provide a hinged connection between the clamp support 40 and the connecting member 60 as shown in the solid line portion of Fig. 1.

When the hanger is used with span wires inclined at angles of from 4 to 6 degrees, the lower hole 44 may be used to provide the hinged connection with the connecting member 60 shown in the dot-and-dash outline portion of Fig. 1.

By using the openings 43 and 44, and adjustablly positioning the clamp support 40 to which the connecting member 60 is hinged in different positions along the feeder cable 14, the wood stick 16 may be supported in a substantially horizontal position for different inclinations of the cable 14.

Since the cable 14 is relatively flexible and the wood stick 16 is connected by hinged connections at each end to the clamp supports 40, a relatively "soft" or flexible mounting is provided for the trolley conductors 11 or 12. This permits vertical movement of the wood stick as a current collector passes along the trolley conductors and eliminates to a great extent "hard" spots in the trolley conductor which tend to produce undesirable noise in an electrically operated vehicle and also cause excessive wear of the trolley conductor.

From the above description and the accompanying drawing, it will be apparent that I have provided a simple and inexpensive construction for double trolley conductor feeder span hangers which is easy to manufacture, and which is reliable in operation. By utilizing clamp supports having bell-mouth ends, rocking movements of the clamp supports is permitted without damage to the insulation of the cable. By supporting the wood stick in insulated relation to the cable at both ends, the amount of clearance between the trolley conductor and the end fittings may be reduced, thus enabling a shorter wood stick to be used. By providing a direct electrical connection between the feeder cable and the trolley ear supporting the trolley conductor which is to be energized from the feeder cable, a solid, low resistance connection is insured which is unaffected by relative movement of the hanger during the passage of current collectors.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. A support device for supporting a pair of trolley conductors in predetermined relation from an inclined span wire which is higher at one point than at another comprising, an elongated insulating member having end fittings, a pair of support members mounted on the insulating member in spaced relation intermediate the end fittings to support the conductors, clamp means having a loosely hinged connection with the end fitting adjacent the low point of the span wire, said clamp means being operable to grip the span wire, an elongated connector bar having a loosely hinged connection at one end with the other end fitting, and additional clamp means having connecting means including a plurality of openings cooperative to provide a loosely hinged connection with the other end of the connector adjustable to grip the span wire in different positions to vary the angular relation of the connector and insulating member, whereby said other end fitting is raised or lowered relative to the span wire.

2. A hanger for supporting a pair of trolley conductors from an inclined insulated feeder span cable comprising, an elongated insulating member having end fittings, support means for the conductors positioned on the insulating member in spaced relation intermediate the ends, a clamp member disposed to grip the insulated cable and having a relatively loosely hinged connection with one end fitting, an elongated connecting bar connected adjacent one end in relatively loosely hinged relation to the other end fitting, additional clamp means adjustably positionable along the conductor adjacent the other end fitting, adjustable connecting means including a plurality of openings in the additional clamp means providing a relatively loose hinge connection between the additional clamp means and said other end fitting, and flexible conductor means electrically connecting one of the support means to the cable.

RAYMOND P. HANNA.

REFERENCES CITED

The following references are of record in the file of this patent:

UNITED STATES PATENTS

| Number | Name | Date |
| --- | --- | --- |
| 2,288,726 | Matthes | July 7, 1942 |

FOREIGN PATENTS

| Number | Country | Date |
| --- | --- | --- |
| 478,996 | France | Nov. 8, 1915 |
| 537,899 | Great Britain | July 11, 1941 |